Aug. 31, 1965  E. A. ALDEN  3,203,134
COMBINED LIVE BAIT TRAP AND PAIL
Filed Jan. 30, 1964  2 Sheets-Sheet 1
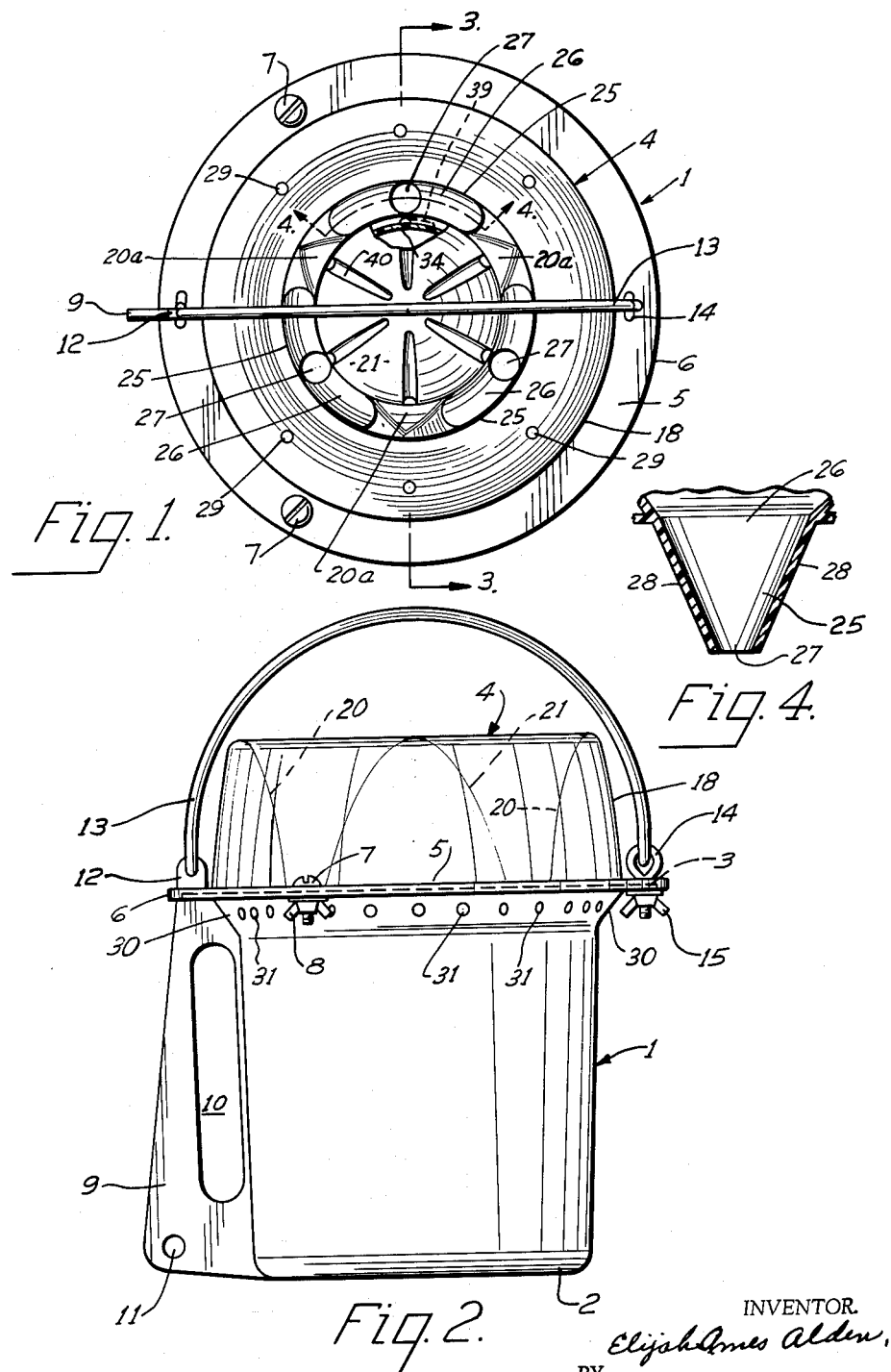
INVENTOR.
Elijah Ames Alden,
BY John H. Leonard,
his ATTORNEY.

Aug. 31, 1965  E. A. ALDEN  3,203,134
COMBINED LIVE BAIT TRAP AND PAIL
Filed Jan. 30, 1964  2 Sheets-Sheet 2
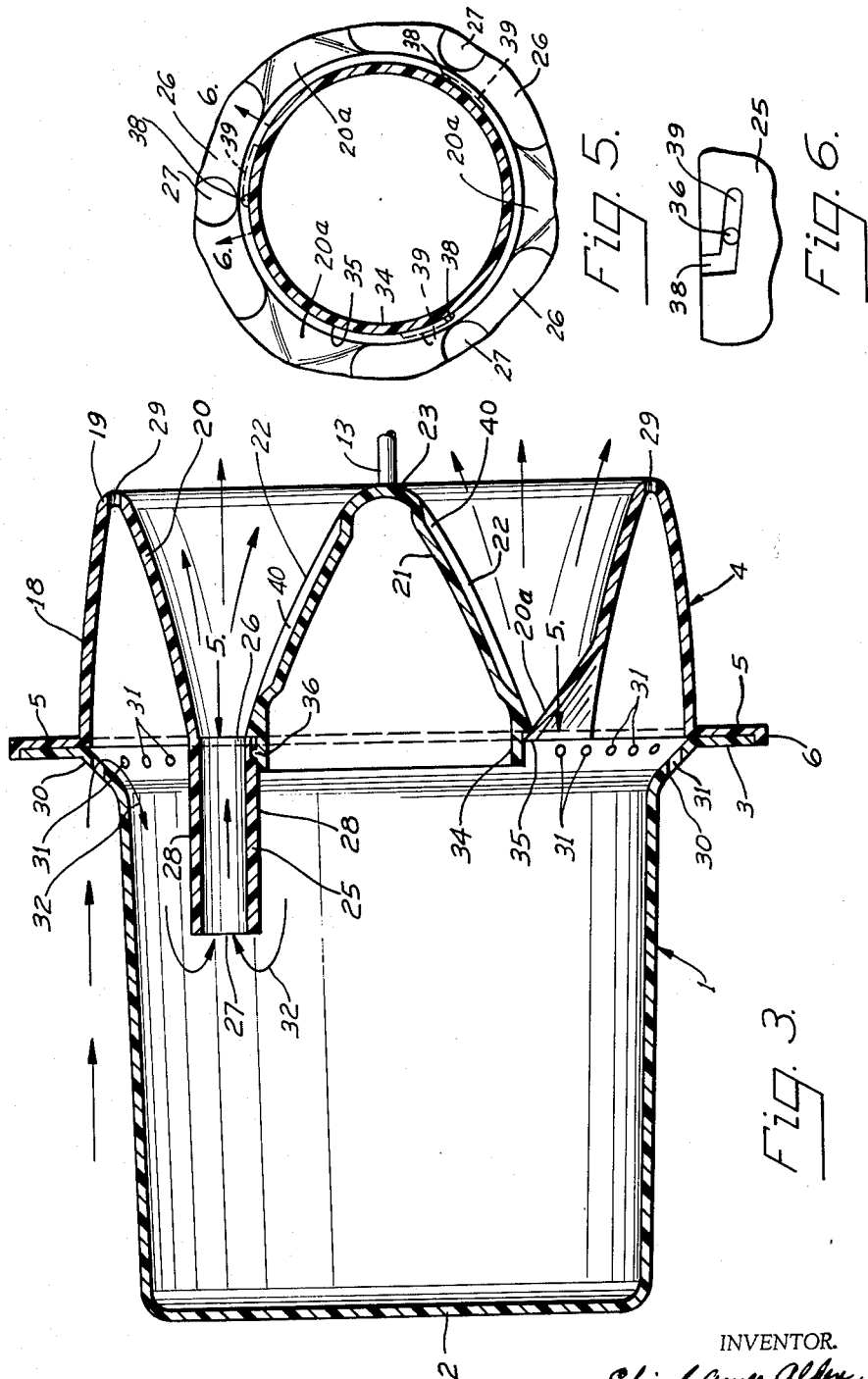
INVENTOR.
Elijah Ames Alden,
BY John H. Cronover,
his ATTORNEY.

United States Patent Office 3,203,134
Patented Aug. 31, 1965

3,203,134
COMBINED LIVE BAIT TRAP AND PAIL
Elijah Ames Alden, 9311 King Memorial Road, Chardon, Ohio
Filed Jan. 30, 1964, Ser. No. 341,200
6 Claims. (Cl. 43—100)

This invention relates to a combined live bait trap and bucket, and particularly to a minnow trap which can be submerged in the water in the conventional manner for trapping minnows and which can be stood upright and used as a bucket, selectively.

Heretofore, combined minnow traps and buckets have been provided. The principal features distinguishing the present invention therefrom are to be found in the arrangement and configuration of the trap entrance for facilitating the entrance of minnows and for permitting ready access for removal of the minnows from the trap when it is being used in an upright position as a bucket, and in the arrangement of ports for maintaining a desirable flow of water through the trap.

Other objects and advantages will become apparent from the following description wherein reference is made to the drawings, in which:

FIGURE 1 is a top plan view of a combined live bait trap and bucket embodying the principles of the present invention;

FIG. 2 is a front elevation of the combined trap and bucket illustrated in FIG. 1;

FIG. 3 is an enlarged axial sectional view of the structure of FIG. 1 and is taken on lines 3—3 thereof;

FIG. 4 is an enlarged fragmentary sectional view of one of the inlet tubes of the trap, and is taken on the line 4—4 of FIG. 1;

FIG. 5 is a fragmentary cross-sectional view taken on the line 5—5 of FIG. 3; and FIG. 6 is a fragmentary sectional view taken on the line 6—6 of FIG. 5.

Referring to the drawings, FIGURES 1 and 2 show the combined trap and bucket disposed with its axis upright, the position in which it is used as a live bait bucket. FIGURE 3 shows the combined trap and bucket with its axis disposed horizontally, the position in which it is used for trapping minnows or other live bait.

Referring to the drawings, this invention includes a bucket 1 having an end or bottom wall 2 and, at the other end an outwardly extending radial flange 3 for cooperation with a cover 4 which forms the trap entrance of the combined trap and bucket. The cover 4 has a basal radial flange 5 terminating at its outer periphery in an annular flange 6. The cover 4 is fastened onto the bucket with the flanges 3 and 5 in face to face juxtaposition, with the flange 6 engaging the outer edge of the flange 3 by means of suitable bolts 7 and wing nuts 8.

Mounted on the peripheral wall of the bucket 1 is a vane 9 which extends endwise of the bucket and has elongated hand opening 10 so that the vane can be gripped in the hand for lifting the combined trap and bucket from the water. The vane 9 has an aperture 11 at the end nearest the bottom wall 2 of the bucket. At the other end it has an ear 12 which extends through suitable aligned slots in the flanges 3 and 5 and is connected to one end of a bail 13. The other end of the bail is passed through an I-bolt 14 which cooperates with a wing nut 15 for holding the bail in place and also clamping the cover to the flange 3 of the bucket. By attaching a line to the bail handle and passing it through the hole 11 the trap can be raised and lowered and supported in the water with its axis horizontal. Generally, the trap is supported in the water with the bottom wall 2 upstream so that the trap entrance opens downstream.

The entrance of the trap, with which the invention is particularly concerned, is preferably incorporated in the cover, but may be otherwise provided. As illustrated, cover 4 comprises an outer peripheral wall 18 which extends forwardly away from the open end of the bucket a substantial distance. At its forward end, indicated at 19, the wall 18 is joined to the forward end of an annular outer guide wall 20. The wall 20 is frusto-conical with its larger base at the forward end of the cover and its smaller base disposed near the open end of the bucket, preferably substantially at the plane of the flange 5. Mounted on the cover is a member 21 having an inner guide wall 22 in radial alignment and inwardly spaced coaxial relation to the outer guide wall 20. The outer surface of the guide wall 22 is preferably somewhat frusto-conical, though slightly curvilinear endwise, its diameter gradually increasing from the forward end 23 of the wall 22 toward the opposite end. The wall 22 preferably terminates at its larger end near to the plane of the flange 5.

The walls 20 and 22 thus define an annular guide passage which is of gradually decreasing cross section, in a plane normal to its axis, from the forward end of the cover to the plane flange 5.

If desired, of course, these walls may extend rearwardly beyond the plane of the flange 5 and protrude into the bucket. With the arrangement thus far described, there normally would be provided an annular restricted inlet into the bucket at the base of the walls 20 and 22. However, such passage must be of substantial width in order to provide access for the minnows, or live bait such as shrimp, or the like. An annular inlet of the required width and coextensive circumferentially with the walls 20 and 22 would be such that the minnows in the bucket could more readily find their way out or escape by happenstance.

In order to reduce the likelihood of mistake to a minimum, a plurality of inlet tubes 25 are provided. In the form illustrated, three such tubes 25 are employed. These tubes have open entrance ends 26 which extend circumferentially in the space between the bases of walls 20 and 21 and thus connect with the rearward end of the guide passage defined by the walls 20 and 22.

The three together provide a total combined inlet passage with a circumferential length preferably half or more of the circumferential length of the guide passage. Each of the tubes 25 has at its rearward end an opening 27 which preferably is circular and of a diameter equal to the width of the rearmost end of the annular guide passage. Thus, each of the tubes 25 has side walls which are generally parallel to each other and edge walls 28 which converge toward each other from the entrance ends 26 to the opening 27. Thus the minnows can readily enter the annular guide passage and swim into the tubes 25 and on through the small opening 27.

The tubes 25 are disposed in spaced relation to the peripheral wall of the bucket 1 so that after the minnows have entered the bucket, they cannot readily find their way back into the tubes 25 and escape.

It is desirable that means be provided for the egress and ingress of air as the trap is submerged, and removed to set upright. For this purpose, small apertures 29 are provided at the juncture 19 of the walls 20 and 18. However, it is also desirable to have an effective flow of water into the trap and out through the tubes 25 and the annular guide passage between the walls 20 and 22. For this purpose the bucket is provided with forwardly flaring portion 30 near its upper end and a plurality of apertures 31 are provided in the portion 30. This provides a wall portion facing into the stream of water passing around the bucket when the forward end of the trap faces downstream. Due to this arrangement, assisted by the overhanging flange 3, a suitable amount of water enters the apertures 31. The apertures 29 have much less total area than the apertures 31, hence only a small amount of the water entering the apertures 31 can discharge through the apertures 29. Instead, most of it flows, as indicated by the arrows 32, into the bucket and out through the openings 27 of the tubes 25, and from the tubes into the annular guide passage between the walls 20 and 22, and thence out of the guide passage to rejoin the downstream flow.

It is desirable, as mentioned, to use the trap as a bait bucket. For this purpose, the bucket must stand upright and must normally be closed at the top, but in such a manner that easy access to the interior is afforded. Accordingly, the member 21 is made hollow and removable. For this purpose, member 21 has a basal longitudinal flange 34 which extends through a central opening 35 defined by the inner sides of the tubes 25 and in inward extension 20a of the wall 20. This flange has a plurality of small nibs 36 thereon and extending outwardly radially thereof. The inner side walls of the members 25 are provided with axial slots 38, leading into circumferentially extending slots 39, the slots 38 being adapted to afford access of the nibs 36 to the slots 39 to provide a saber connection. The member 21 can be inserted into operating position with the nibs 36 aligned with and entering slots 38, respectively, then turned to effect the connection of the nibs in the slots 39. Suitable flutes 40 are provided in the outer face of the member 21 to facilitate its being gripped and turned by hand.

The bucket 2, the cover 4, and tubes 25 are of set synthetic organic plastic which is very clear and transparent so that the structure is practically invisible in the water. This has the advantage of having no visible structure opposing the normal movement of the minnows into the trap. Furthermore, since the minnows can readily be seen in a concentration within the trap, they act as a lure for luring larger fish to the locality.

As mentioned, the wall 2 of the bucket normally is disposed upstream in flowing water and hence the water can flow readily into the bucket, or trap, and out through the guide entrance so that the minnows can enter by following their normal procedure of swimming upstream in search of food. Suitable bait may be placed in the trap, if desired.

It is apparent from the foregoing description that the guide passage to the trap is large throughout its axial extent, and not cramped down to a single central opening at its rearward end, as in the conventional traps. Instead, a plurality of entrance ports into the bucket are provided, so that the minnows converging between the walls 20 and 22 are readily guided into the bucket without being packed together at a single opening. Thus they can enter more readily.

Having thus described my invention, I claim:

1. A combined live bait trap and pail comprising a hollow body having a closed rear end and a forward end with inner and outer radially aligned and radially spaced guide walls defining an annular guide passage of gradually diminishing cross section in a direction rearwardly of the body, said guide walls terminating rearwardly in forwardly spaced relation to the rear end of the body, a plurality of tubular members in the body and extending, endwise, forwardly and rearwardly of the body and distributed in laterally spaced relation to each other circumferentially of the guide passage, each member having a passage extending endwise therethrough and in communication at its forward end with the guide passage and at its opposite end with the interior of the body in spaced relation to the walls of the body.

2. The structure according to claim 1 wherein means are associated with the body for causing water flowing exteriorly of the body in a direction from said closed end toward said forward end to flow into the body and through said passages of the tubular members and out of said guide passage.

3. The structure according to claim 2 wherein said means include an outwardly, flared, rearwardly facing wall portion on the body spaced from its ends and having apertures therein to admit water into the body.

4. The structure according to claim 1, wherein the body includes an outer wall joined to the outer guide wall at the inlet end of the guide passage and the joined walls are relatively divergent away from their juncture toward the rear end of the body and a plurality of openings are provided in the body at the junction of said outer wall and said outer guide wall.

5. A minnow trap comprising a hollow body having a guide passage in one end of the body opening to the outside of the body, a plurality of inlet devices carried in the body and extending endwise thereof, said devices being of substantial length and being spaced apart laterally from each other in directions transversely of the body, and each inlet device having an open inlet end facing said one end of the body and connected to the guide passage, and an open outlet end spaced from all walls of the body, each device having a peripheral wall converging from the inlet end of the device toward the outlet end of the device.

6. The structure according to claim 1 wherein the passage of each of said members is of gradually decreasing cross section in a direction from front to rear.

References Cited by the Examiner

UNITED STATES PATENTS

| | | | |
|---|---|---|---|
| 1,621,318 | 3/27 | Edwards et al. | 43—121 |
| 1,667,048 | 4/28 | Rawlings | 43—64 |
| 2,255,360 | 9/41 | Miller | 43—121 |
| 2,465,812 | 3/49 | Mohme | 43—100 |
| 2,755,594 | 7/56 | Booth et al. | 43—56 X |

ABRAHAM G. STONE, *Primary Examiner.*